(12) United States Patent
Miller (10) Patent No.: US 12,435,641 B1
(45) Date of Patent: Oct. 7, 2025

(54) TAILORING AIRCRAFT POWERPLANT SPLIT LINE WITH INFLATABLE BLADDER(S)

(71) Applicant: RTX Corporation, Farmington, CT (US)

(72) Inventor: Michael D. Miller, Tucson, AZ (US)

(73) Assignee: RTX Corporation, Farmington, CT (US)

(*) Notice: Subject to any disclaimer, the term of this patent is extended or adjusted under 35 U.S.C. 154(b) by 0 days.

(21) Appl. No.: 18/628,235

(22) Filed: Apr. 5, 2024

(51) Int. Cl.
*F01D 17/00* (2006.01)
*F01D 17/14* (2006.01)

(52) U.S. Cl.
CPC ........... *F01D 17/00* (2013.01); *F01D 17/143* (2013.01); *F05D 2220/323* (2013.01)

(58) Field of Classification Search
CPC ... F01D 17/00; F01D 17/143; F05D 2220/323
See application file for complete search history.

(56) References Cited

U.S. PATENT DOCUMENTS

| | | | | |
|---|---|---|---|---|
| 3,279,192 A * | 10/1966 | Hull, Jr. | ................ | B64C 11/001 |
| | | | | 415/28 |
| 3,611,724 A * | 10/1971 | Kutney | .................. | F02C 7/042 |
| | | | | 137/15.1 |
| 3,618,699 A | 11/1971 | Evans | | |
| 3,721,389 A * | 3/1973 | MacKinnon | ......... | F02K 1/1207 |
| | | | | 239/265.19 |
| 4,155,221 A | 5/1979 | Dhoore | | |
| 5,311,736 A * | 5/1994 | Lardellier | ............... | F02K 3/075 |
| | | | | 60/226.3 |
| 5,344,284 A * | 9/1994 | Delvaux | .................. | F01D 11/22 |
| | | | | 415/173.2 |
| 5,655,360 A * | 8/1997 | Butler | ....................... | F02K 1/72 |
| | | | | 239/265.29 |
| 5,778,659 A * | 7/1998 | Duesler | .................... | F02K 1/72 |
| | | | | 244/110 B |
| 5,853,148 A * | 12/1998 | Standish | ................... | F02K 1/72 |
| | | | | 239/265.29 |
| 8,286,654 B2 * | 10/2012 | Prasad | .................... | F02C 7/042 |
| | | | | 137/15.1 |

(Continued)

FOREIGN PATENT DOCUMENTS

| GB | 800380 A | 8/1958 |
|---|---|---|
| GB | 1067129 A | 5/1967 |

(Continued)

OTHER PUBLICATIONS

EP Search Report for EP Patent Application No. 25168962.6 dated May 12, 2025.

*Primary Examiner* — Brian Christopher Delrue
(74) *Attorney, Agent, or Firm* — Getz Balich LLC (57) ABSTRACT

An assembly is provided for an aircraft propulsion system. This assembly includes a propulsor rotor and a flowpath wall. The propulsor rotor is rotatable about an axis. The propulsor rotor includes a plurality of propulsor blades and an inner platform. The propulsor blades are arranged circumferentially about the axis and project radially out from the inner platform. The flowpath wall is next to and downstream of the inner platform. The flowpath wall includes an inflatable bladder and a radial outer surface. The inflatable bladder is configured to change a geometry of the radial outer surface.

19 Claims, 9 Drawing Sheets

(56) References Cited

U.S. PATENT DOCUMENTS

| | | | | |
|---|---|---|---|---|
| 9,010,126 | B2* | 4/2015 | Stern | F02K 1/002 |
| | | | | 239/265.43 |
| 10,738,699 | B2* | 8/2020 | Burnside | B01D 45/08 |
| 11,560,811 | B2* | 1/2023 | Bifulco | F01D 9/042 |
| 12,221,896 | B1* | 2/2025 | Jaiswal | F01D 21/14 |
| 12,228,037 | B1* | 2/2025 | Kray | F01D 17/16 |
| 2006/0101807 | A1* | 5/2006 | Wood | F02K 1/386 |
| | | | | 60/262 |
| 2009/0208328 | A1* | 8/2009 | Stern | F02K 1/10 |
| | | | | 60/226.3 |
| 2010/0196155 | A1* | 8/2010 | Twell | F01D 25/246 |
| | | | | 415/209.3 |
| 2010/0215479 | A1 | 8/2010 | Prasad | |
| 2016/0053685 | A1* | 2/2016 | Labrecque | F02C 7/045 |
| | | | | 415/119 |
| 2017/0254205 | A1* | 9/2017 | Diwinsky | B23K 20/1215 |
| 2024/0309773 | A1* | 9/2024 | Heeter | F01D 17/162 |

FOREIGN PATENT DOCUMENTS

| | | | |
|---|---|---|---|
| GB | 2489475 | A | 10/2012 |
| JP | S58107842 | A | 6/1983 |
| WO | 2002036951 | A1 | 5/2002 |
| WO | 2021214402 | A1 | 10/2021 |

\* cited by examiner

TAILORING AIRCRAFT POWERPLANT SPLIT LINE WITH INFLATABLE BLADDER(S)

BACKGROUND OF THE DISCLOSURE

1. Technical Field

This disclosure relates generally to an aircraft propulsion system and, more particularly, to flow splitting within the aircraft propulsion system.

2. Background Information

A turbofan engine for an aircraft propulsion system includes a splitter for splitting incoming air into a core flowpath and a bypass flowpath. Various turbofan engine arrangements are known in the art for tailoring the splitting of the incoming air into the core flowpath and the bypass flowpath. While these known turbofan engine arrangements have various benefits, there is still room in the art for improvement.

SUMMARY OF THE DISCLOSURE

According to an aspect of the present disclosure, an assembly is provided for an aircraft propulsion system. This assembly includes a propulsor rotor and a flowpath wall. The propulsor rotor is rotatable about an axis. The propulsor rotor includes a plurality of propulsor blades and an inner platform. The propulsor blades are arranged circumferentially about the axis and project radially out from the inner platform. The flowpath wall is next to and downstream of the inner platform. The flowpath wall includes an inflatable bladder and a radial outer surface. The inflatable bladder is configured to change a geometry of the radial outer surface.

According to another aspect of the present disclosure, another assembly is provided for an aircraft propulsion system. This assembly includes a bladed rotor, an inner flowpath wall and an outer flowpath wall. The bladed rotor is rotatable about an axis. The inner flowpath wall is downstream of the bladed rotor. The inner flowpath wall includes an inner inflatable bladder and a radial outer surface. The inner inflatable bladder is configured to change a geometry of the radial outer surface. The radial outer surface forms a radial inner peripheral boundary of a flowpath. The outer flowpath wall axially overlaps and circumscribes the inner flowpath wall. The outer flowpath wall includes an outer inflatable bladder and a radial inner surface. The outer inflatable bladder is configured to change a geometry of the radial inner surface. The radial inner surface forms a radial outer peripheral boundary of the flowpath.

According to still another aspect of the present disclosure, another assembly is provided for an aircraft propulsion system. This assembly includes a propulsor rotor and a flowpath wall. The propulsor rotor is rotatable about an axis. The flowpath wall is next to an outer periphery of the propulsor rotor. The flowpath wall includes an inflatable bladder and a radial inner surface that is downstream of the propulsor rotor. The inflatable bladder is configured to change a geometry of the radial inner surface. When viewed in a reference plane parallel with the axis, the radial inner surface has a convex geometry or a straight line geometry with the inflatable bladder deflated.

The assembly may also include a splitter downstream of the propulsor rotor. The splitter may form an outer peripheral boundary of an inlet into a core flowpath. The splitter may form an inner peripheral boundary of an inlet into a bypass flowpath. At least an axial majority of the inflatable bladder may be arranged upstream of the splitter.

The assembly may also include an air system fluidly coupled to an interior volume of the inflatable bladder.

The air system may be configured to at least one of: direct air into the interior volume of the inflatable bladder to deform the radial outer surface in a radial outward direction; or direct air out of the interior of the inflatable bladder to deform the radial outer surface in a radial inward direction.

When viewed in a reference plane parallel with the axis, at least one of: the radial outer surface may have a convex geometry with the inflatable bladder inflated; or the radial outer surface may have a straight line geometry with the inflatable bladder deflated.

The inflatable bladder may include a deformable face skin, a rigid backing and an interior volume radially between the deformable face skin and the rigid backing.

The deformable face skin may be configured to rest radially against the rigid backing with the inflatable bladder deflated.

The deformable face skin may be spaced radially from the rigid backing with the inflatable bladder deflated.

The deformable face skin may be configured from or otherwise include a polymer matrix and fiber reinforcement embedded within the polymer matrix. The rigid backing may be configured from or otherwise include metal.

The inflatable bladder may be annular.

The inflatable bladder may be arcuate.

The propulsor rotor may be configured as or otherwise include a fan rotor.

The assembly may also include an engine core. The engine core may be configured to drive rotation of the propulsor rotor about the axis. The engine core may include a core flowpath, a compressor section, a combustor section and a turbine section. The core flowpath may extend from a core inlet into the core flowpath, through the compressor section, the combustor section and the turbine section, to a core exhaust from the core flowpath. The inflatable bladder may be disposed at the core inlet.

The inflatable bladder may be arranged upstream of the core inlet.

The assembly may also include a bypass flowpath and a splitter. The bypass flowpath may be disposed outside of the engine core. The bypass flowpath may extend from a bypass inlet into the bypass flowpath to a bypass exhaust from the bypass flowpath. The splitter may be downstream of the propulsor rotor. The splitter may form an outer peripheral boundary of the core inlet. The splitter may form an inner peripheral boundary of the bypass inlet.

The flowpath wall may be an inner flowpath wall and the inflatable bladder may be an inner inflatable bladder. The assembly may also include an outer flowpath wall that includes an outer inflatable bladder and a radial inner surface. The outer inflatable bladder may be disposed at the bypass inlet. The outer inflatable bladder may be configured to change a geometry of the radial inner surface.

The flowpath wall may be an inner flowpath wall and the inflatable bladder may be an inner inflatable bladder. The assembly may also include an outer flowpath wall next to an outer periphery of the propulsor rotor. The outer flowpath wall may include an outer inflatable bladder and a radial inner surface that is downstream of the propulsor rotor. The outer inflatable bladder may be configured to change a geometry of the radial inner surface.

The flowpath wall may be an inner flowpath wall and the inflatable bladder may be an inner inflatable bladder. The assembly may also include an outer flowpath wall next to an outer periphery of the propulsor rotor. The outer flowpath wall may include an outer inflatable bladder and a radial inner surface that is upstream of the propulsor rotor. The outer inflatable bladder may be configured to change a geometry of the radial inner surface.

The flowpath wall may be a downstream flowpath wall. The inflatable bladder may be a downstream inflatable bladder. The radial outer surface may be a downstream radial outer surface. The assembly may also include an upstream flowpath wall next to and upstream of the inner platform. The upstream flowpath wall may include an upstream inflatable bladder and an upstream radial outer surface. The upstream inflatable bladder may be configured to change a geometry of the upstream radial outer surface.

The assembly may also include a stationary nose cone that comprises the upstream flowpath wall.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
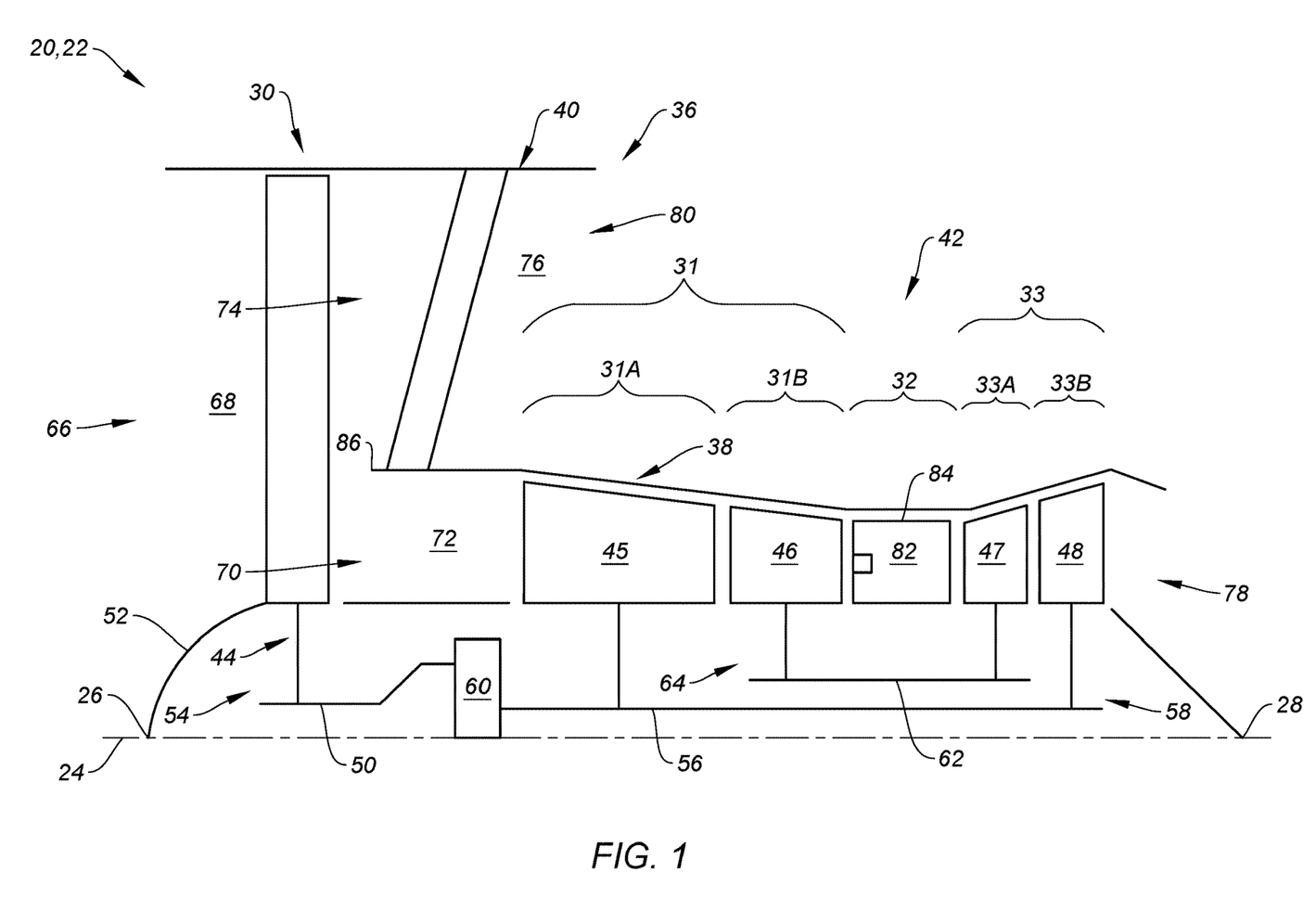
FIG. 1 is a partial schematic illustration of a powerplant for an aircraft propulsion system.

FIG. 1 illustrates a powerplant 20 of a propulsion system for an aircraft. The aircraft may be an airplane, a drone (e.g., an unmanned aerial vehicle (UAV)), or any other manned or unmanned aerial vehicle or system. For ease of description, the aircraft propulsion system is described below as a ducted rotor propulsion system such as a turbofan propulsion system, and the aircraft powerplant 20 is described below as a gas turbine engine 22 such as a turbofan engine. The present disclosure, however, is not limited to such exemplary aircraft propulsion system and/or aircraft powerplant configurations.

The turbine engine 22 extends axially along an axis 24 between a forward, upstream end 26 of the turbine engine 22 and an aft, downstream end 28 of the turbine engine 22. Briefly, the axis 24 may be a centerline axis of the turbine engine 22 and/or one or more of its members. The axis 24 may also or alternatively be a rotational axis for one or more members of the turbine engine 22. The turbine engine 22 of FIG. 1 includes a propulsor section 30 (e.g., a fan section), a compressor section 31, a combustor section 32 and a turbine section 33. The compressor section 31 includes a low pressure compressor (LPC) section 31A and a high pressure compressor (HPC) section 31B. The turbine section 33 includes a high pressure turbine (HPT) section 33A and a low pressure turbine (LPT) section 33B.

The engine sections 30-33B may be arranged sequentially along the axis 24 within an engine housing 36. This engine housing 36 includes an inner housing structure 38 (e.g., a core case structure) and an outer housing structure 40 (e.g., a propulsor case structure). The inner housing structure 38 may house one or more of the engine sections 31A-33B; e.g., a core 42 of the turbine engine 22. The outer housing structure 40 may house at least the propulsor section 30.

The propulsor section 30 includes a bladed propulsor rotor 44; e.g., a fan rotor. The LPC section 31A includes a bladed low pressure compressor (LPC) rotor 45. The HPC section 31B includes a bladed high pressure compressor (HPC) rotor 46. The HPT section 33A includes a bladed high pressure turbine (HPT) rotor 47. The LPT section 33B includes a bladed low pressure turbine (LPT) rotor 48.

The propulsor rotor 44 of FIG. 1 is connected to and rotatable with a propulsor shaft 50; e.g., a fan shaft. The propulsor rotor 44 of FIG. 1 is also connected to and rotatable with a nose cone 52. At least (or only) the propulsor rotor 44, the propulsor shaft 50 and the nose cone 52 collectively form a propulsor rotating assembly 54. This propulsor rotating assembly 54 of FIG. 1 and its members 44, 50 and 52 are rotatable about the axis 24. Here, the nose cone 52 may be referred to as a spinner since the nose cone 52 of FIG. 1 is rotatable with the propulsor rotating assembly 54 and its propulsor rotor 44. It is contemplated, however, the nose cone 52 may alternatively be a stationary member of the turbine engine 22 where, for example, the nose cone 52 is fixed to (or part of) the inner housing structure 38 or another stationary structure of the turbine engine 22.

The LPC rotor 45 is coupled to and rotatable with the LPT rotor 48. The LPC rotor 45 of FIG. 1, for example, is connected to the LPT rotor 48 through a low speed shaft 56. At least (or only) the LPC rotor 45, the LPT rotor 48 and the low speed shaft 56 collectively form a low speed rotating assembly 58; e.g., a low speed spool of the engine core 42. This low speed rotating assembly 58 of FIG. 1 and its members 45, 48 and 56 are rotatable about the axis 24; however, it is contemplated the low speed rotating assembly 58 may alternatively be rotatable about another axis radially and/or angularly offset from the axis 24. Referring again to FIG. 1, the low speed rotating assembly 58 is also coupled to the propulsor rotating assembly 54. The low speed rotating assembly 58 of FIG. 1, for example, is connected to the propulsor rotating assembly 54 through a geartrain 60; e.g., an epicyclic gear system, a transmission, etc. With this arrangement, the low speed rotating assembly 58 and its LPT rotor 48 may rotate at a different (e.g., faster) rotational velocity than the propulsor rotating assembly 54 and its propulsor rotor 44. However, it is contemplated the propulsor rotor 44 may alternatively be coupled to the low speed rotating assembly 58 and its LPT rotor 48 without the geartrain 60 such that the LPT rotor 48 may directly drive rotation of the propulsor rotor 44 through a shaft (e.g., the low speed shaft 56) or a shaft assembly.

The HPC rotor 46 is coupled to and rotatable with the HPT rotor 47. The HPC rotor 46 of FIG. 1, for example, is connected to the HPT rotor 47 through a high speed shaft 62. At least (or only) the HPC rotor 46, the HPT rotor 47 and the high speed shaft 62 collectively form a high speed rotating assembly 64; e.g., a high speed spool of the engine core 42. This high speed rotating assembly 64 of FIG. 1 and its members 46, 47 and 62 are rotatable about the axis 24; however, it is contemplated the high speed rotating assembly 64 may alternatively be rotatable about another axis radially and/or angularly offset from the axis 24.

During operation, air enters the turbine engine 22 through an airflow inlet 66. This air is directed from the airflow inlet 66 and propelled by the propulsor rotor 44 through a propulsor flowpath 68 to an inlet 70 into a (e.g., annular) core flowpath 72 and an inlet 74 into a (e.g., annular) bypass flowpath 76. The propulsor flowpath 68 extends through the propulsor section 30. The core flowpath 72 of FIG. 1 extends sequentially through the LPC section 31A, the HPC section 31B, the combustor section 32, the HPT section 33A and the LPT section 33B from the core inlet 70 to a combustion products exhaust 78 out from the core flowpath 72 and the engine core 42. The air entering the core flowpath 72 from the propulsor flowpath 68 may be referred to as "core air". The bypass flowpath 76 of FIG. 1 extends through a (e.g., annular) bypass duct from the bypass inlet 74 to an airflow exhaust 80 out from the bypass flowpath 76. This bypass flowpath 76 and its bypass duct bypass (e.g., are disposed radially outboard of and extend along) the engine core 42. The air entering the bypass flowpath 76 from the propulsor flowpath 68 may be referred to as "bypass air".

The core air is compressed by the LPC rotor 45 and the HPC rotor 46 and is directed into a (e.g., annular) combustion chamber 82 of a (e.g., annular) combustor 84 in the combustor section 32. Fuel is injected into the combustion chamber 82 and mixed with the compressed core air to provide a fuel-air mixture. This fuel-air mixture is ignited and combustion products thereof flow through and sequentially drive rotation of the HPT rotor 47 and the LPT rotor 48 about the axis 24. The rotation of the HPT rotor 47 and the LPT rotor 48 respectively drive rotation of the HPC rotor 46 and the LPC rotor 45 about the axis 24 and, thus, compression of the air received from the core inlet 70. The rotation of the LPT rotor 48 also drives rotation of the propulsor rotor 44. The rotation of the propulsor rotor 44 propels the bypass air through and out of the bypass flowpath 76. The propulsion of the bypass air may account for a majority of thrust generated by the turbine engine 22, e.g., more than seventy-five percent (75%) of engine thrust. The turbine engine 22 of the present disclosure, however, is not limited to the foregoing exemplary thrust ratio.

Figure 2:
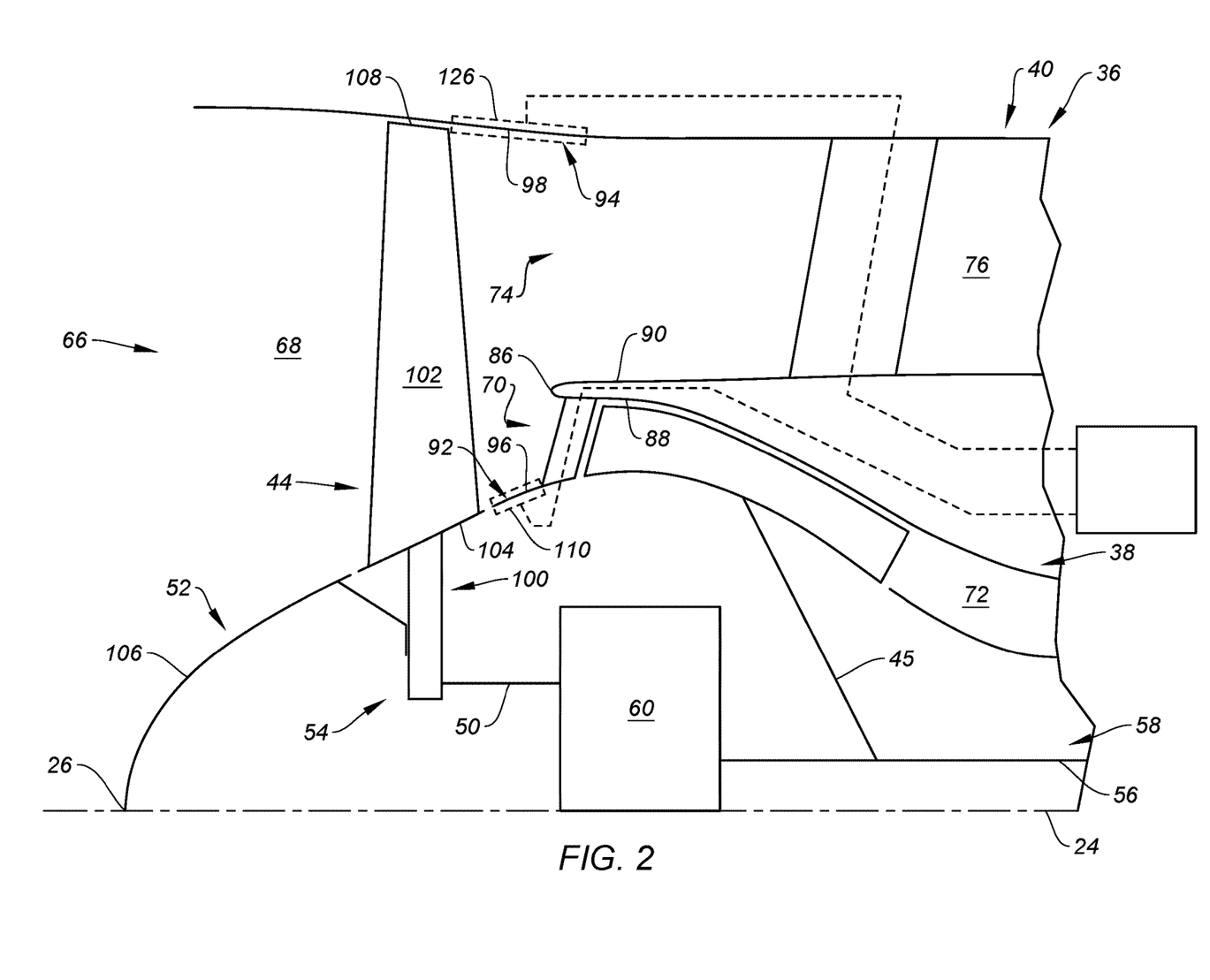
FIG. 2 is a schematic illustration of a portion of the powerplant at a splitter between flowpaths with inner and outer inflatable bladders.

Referring to FIG. 2, the airflow propelled by the propulsor rotor 44 out of the propulsor flowpath 68 is split into the core flowpath 72 and the bypass flowpath 76 by a splitter 86. This splitter 86 is a (e.g., annular) wedge-shaped structure of the engine housing 36 at a downstream end of the propulsor flowpath 68. The splitter 86 provides an intersection between a radial outer wall 88 of the core flowpath 72 and a radial inner wall 90 of the bypass flowpath 76. The splitter 86 also forms a forward, upstream distal end of the core flowpath outer wall 88 and the bypass flowpath inner wall 90.

The splitter 86 is located radially between and radially spaced from a radial inner flowpath wall 92 of the inner housing structure 38 and a radial outer flowpath wall 94 of the outer housing structure 40. The splitter 86, the inner flowpath wall 92 and the outer flowpath wall 94 each extends circumferentially about (e.g., completely around) the axis 24 providing that respective engine housing member 86, 92, 94 with, for example, a full-hoop geometry. With this arrangement, the splitter 86 and the inner flowpath wall 92 form the core inlet 70, and the splitter 86 and the outer flowpath wall 94 form the bypass inlet 74. In particular, the inner flowpath wall 92 forms a radial inner peripheral boundary of the core inlet 70. The splitter 86 forms a radial outer peripheral boundary of the core inlet 70 radially opposite the inner flowpath wall 92. The splitter 86 also forms a radial inner peripheral boundary of the bypass inlet 74 radially opposite the outer flowpath wall 94. The outer flowpath wall 94 forms a radial outer peripheral boundary of the bypass inlet 74.

A ratio of the airflow flowing out of the propulsor flowpath 68 into the core flowpath 72 and the bypass flowpath 76 is related to several split line parameters. These split line parameters include, but are not limited to: a radial location of the splitter 86 between the inner flowpath wall 92 and the outer flowpath wall 94; a configuration (e.g., shape, dimensions, etc.) of the splitter 86; a configuration of the inner flowpath wall 92; and a configuration of the outer flowpath wall 94. In a typical gas turbine engine, each of the foregoing split line parameters is fixed and is selected to provide a compromise in engine performance between various engine operating modes; e.g., part throttle, full throttle, etc. The turbine engine 22 of FIG. 2, by contrast, is configured with one or more adjustable split line parameters which may be changed during turbine engine operation based on, for example, its engine operating mode. The inner flowpath wall 92 of FIG. 2, for example, is configured with a deformable radial outer surface 96. The outer flowpath wall 94 of FIG. 2 is also configured with a deformable radial inner surface 98.

The inner flowpath wall 92 of FIG. 2 is disposed axially next to (e.g., adjacent) and downstream of the propulsor rotor 44. The outer flowpath wall 94 of FIG. 2 is disposed radially next to and radially outboard of an outer periphery of the propulsor rotor 44. This propulsor rotor 44 of FIG. 2 includes a rotor base 100 (e.g., a disk or a hub) and a plurality of propulsor rotor blades 102; e.g., fan blades.

The rotor base 100 forms a radial inner platform 104 for the propulsor rotor 44. This inner platform 104 is disposed and extends axially between a radial outer wall 106 of the nose cone 52 and the inner flowpath wall 92. The inner platform 104 along with the radial outer wall 106 of the nose cone 52 and the inner flowpath wall 92 may thereby collectively form a radial inner peripheral boundary of the propulsor flowpath 68. Here, the nose cone 52 is connected to (e.g., attached to) the rotor base 100 radially inboard of the inner platform 104; however, the present disclosure is not limited to such an exemplary arrangement.

The rotor blades 102 are arranged circumferentially around the rotor base 100 and the axis 24 in an annular array; e.g., a circumferentially equispaced circular array. Each of the rotor blades 102 is connected to the rotor base 100. Each of the rotor blades 102, for example, may be formed integral with or mechanically fastened, welded, brazed and/or otherwise attached to the rotor base 100. Each of the rotor blades 102 projects spanwise out from the rotor base 100 and a radial outer surface of its inner platform 104 to a radial outer distal end 108 (e.g., a tip) of the respective rotor blade 102, where the rotor blade ends 108 collectively form the outer periphery of the propulsor rotor 44.

Figure 3A:
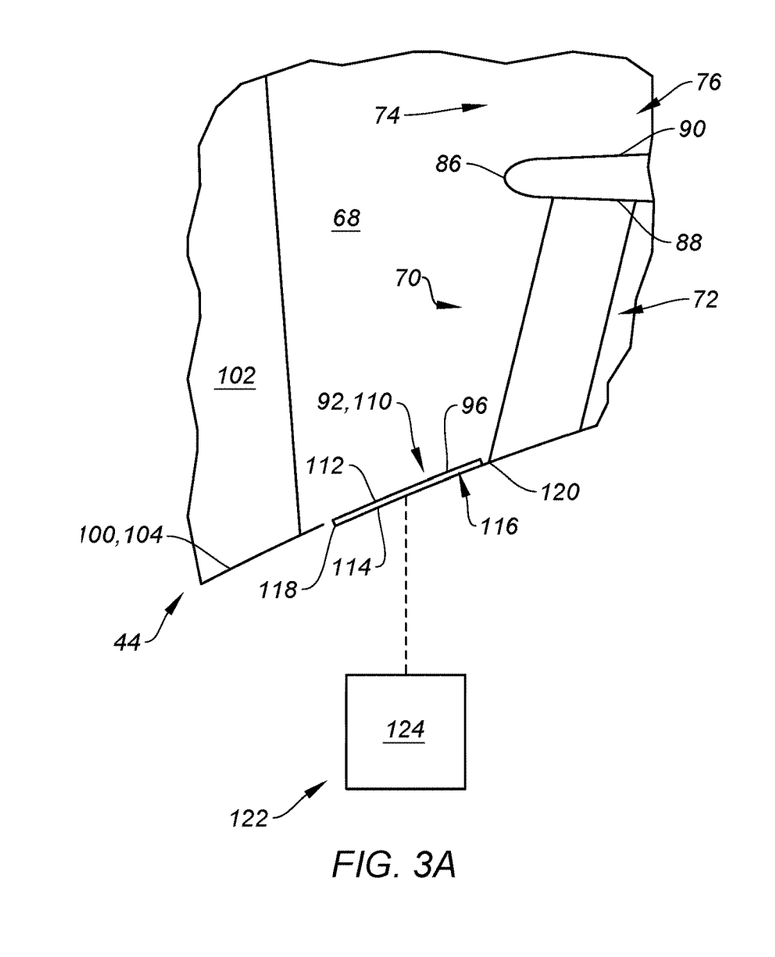
FIGS. 3A and 3B are schematic illustrations of a portion of the powerplant with the inner inflatable bladder in various arrangements.
Figure 3B:
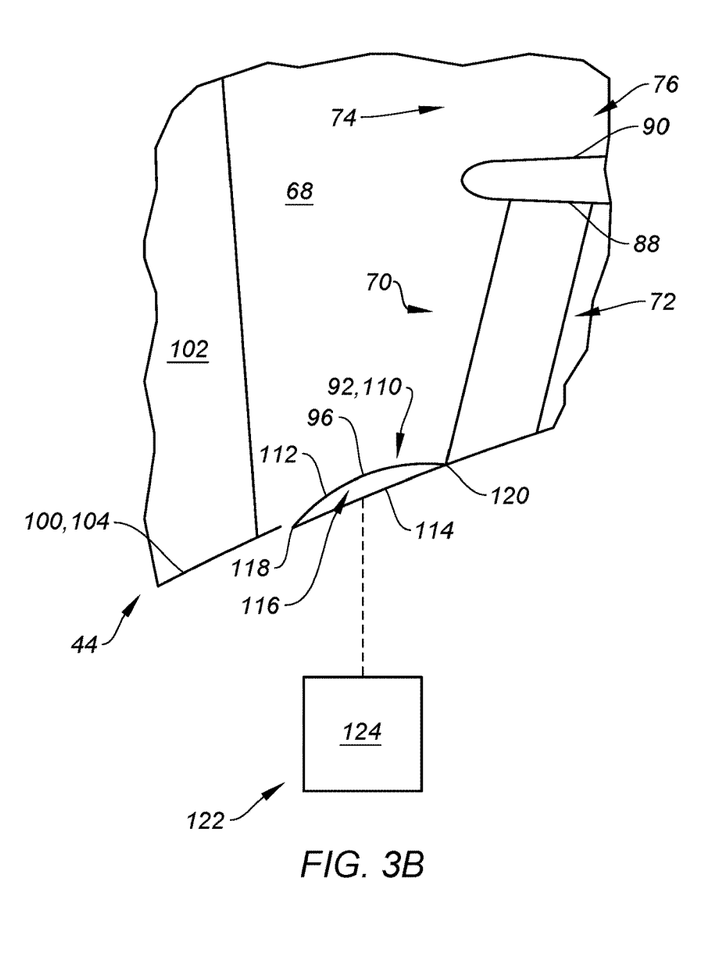

The inner flowpath wall 92 extends longitudinally along the propulsor flowpath 68 to a forward, upstream end of the inner flowpath wall 92. This upstream end of the inner flowpath wall 92 may be disposed next to (e.g., adjacent) and downstream of an aft, downstream end of the inner platform 104. Referring to FIGS. 3A and 3B, the inner flowpath wall 92 is configured with an inner inflatable bladder 110 which at least partially or completely forms the radial outer surface 96. The inner inflatable bladder 110 of FIGS. 3A and 3B, for example, includes an inner deformable face skin 112, an inner rigid backing 114 (e.g., a back skin, a support structure, etc.) and an inner interior volume 116.

The inner deformable face skin 112 extends from (or about) the upstream end of the inner flowpath wall 92 to (or about) the core inlet 70. The inner deformable face skin 112 and, more generally, the inner inflatable bladder 110 may thereby be disposed at (e.g., on, adjacent or proximate) and upstream of the core inlet 70. The inner deformable face skin 112 extends circumferentially about (e.g., completely around) the axis 24 providing the inner deformable face skin 112 with a full-hoop (e.g., tubular, frustoconical) geometry. The inner deformable face skin 112 of FIGS. 3A and 3B may thereby form at least a longitudinal section (e.g., axial section) of or an entirety of the radial outer surface 96 of the inner flowpath wall 92.

The inner deformable face skin 112 is constructed from a deformable and resilient material; e.g., a non-metal composite material. The inner deformable face skin 112, for example, may include a polymer matrix and fiber reinforcement embedded within the polymer matrix. The polymer matrix may be an elastomer such as rubber. The fiber reinforcement may include one or more woven or non-woven layers of long-strand, short-strand or chopped fibers; e.g., fiberglass fibers, carbon fibers, aramid fibers (e.g., Kevlar® fibers), or any combination thereof. It is contemplated, however, the inner deformable face skin 112 may alternatively be constructed from the polymer matrix with the fiber reinforcement to a side of the polymer matrix or even without the fiber reinforcement in select embodiments. The present disclosure, however, is not limited to such exemplary inner deformable face skin constructions or materials.

This inner rigid backing 114 extends from (or about) the upstream end of the inner flowpath wall 92 to (or about) the core inlet 70. The inner rigid backing 114 extends circumferentially about (e.g., completely around) the axis 24 providing the inner rigid backing 114 with a full-hoop (e.g., tubular, frustoconical) geometry. This inner rigid backing 114 may be cast, machined, additive manufactured and/or otherwise formed as a metal hoop structure. Alternatively, the inner rigid backing 114 may be formed from shaped sheet metal. The present disclosure, however, is not limited to such exemplary inner rigid backing constructions or materials. For example, the inner rigid backing 114 may alternatively be formed from a rigid non-metal composite material.

The inner rigid backing 114 may be configured as, or may otherwise include, a backing wall and/or a back frame for the inner inflatable bladder 110. The inner deformable face skin 112 of FIGS. 3A and 3B, for example, is connected to the inner rigid backing 114 at or about opposing axial ends 118 and 120 of the inner inflatable bladder 110 and its members 112 and 114. At these connections, the inner deformable face skin 112 is also sealed (e.g., directly or indirectly) against the inner rigid backing 114. The inner interior volume 116 is thereby formed by the inner deformable face skin 112 and the inner rigid backing 114. The inner interior volume 116 of FIGS. 3A and 3B, for example, extends radially within the inner inflatable bladder 110 between and to the inner deformable face skin 112 and the inner rigid backing 114. The inner interior volume 116 of FIGS. 3A and 3B extends axially within the inner inflatable bladder 110 between and to the connections between the inner deformable face skin 112 and the inner rigid backing 114.

When the inner inflatable bladder 110 is deflated as shown in FIG. 3A, the inner interior volume 116 may substantially or completely collapse and the inner deformable face skin 112 may engage and lay against the inner rigid backing 114. However, when the inner inflatable bladder 110 is inflated as shown in FIG. 3B, the inner interior volume 116 grows in size and the inner deformable face skin 112 moves radially away from and is spaced from (e.g., at an axial center of the inner inflatable bladder 110) the inner rigid backing 114.

The inflating and deflating of the inner inflatable bladder 110 is controlled by an air system 122 of the turbine engine 22. This air system 122 includes an air source 124 which is fluidly coupled to the inner interior volume 116. Examples of the air source 124 include, but are not limited to, a bleed from the compressor section 31 (see FIG. 1), a standalone air compressor, a compressed air reservoir (e.g., tank) or the like.

The air system 122 is configured to direct air into the inner interior volume 116 to inflate the inner inflatable bladder 110; e.g., from the arrangement of FIG. 3A to FIG. 3B. This inflation of the inner inflatable bladder 110 deforms the inner deformable face skin 112 and thereby changes a sectional geometry of the radial outer surface 96. More particularly, the inflation of the inner inflatable bladder 110 pushes (e.g., bulges) an axial center of the inner deformable face skin 112 radially outwards away from the axis 24 (see FIG. 2). The inner deformable face skin 112 and the radial outer surface 96 may thereby have a convex geometry when viewed, for example, in a reference plane parallel with (e.g., including) the axis 24 (see FIG. 2).

Figure 4A:
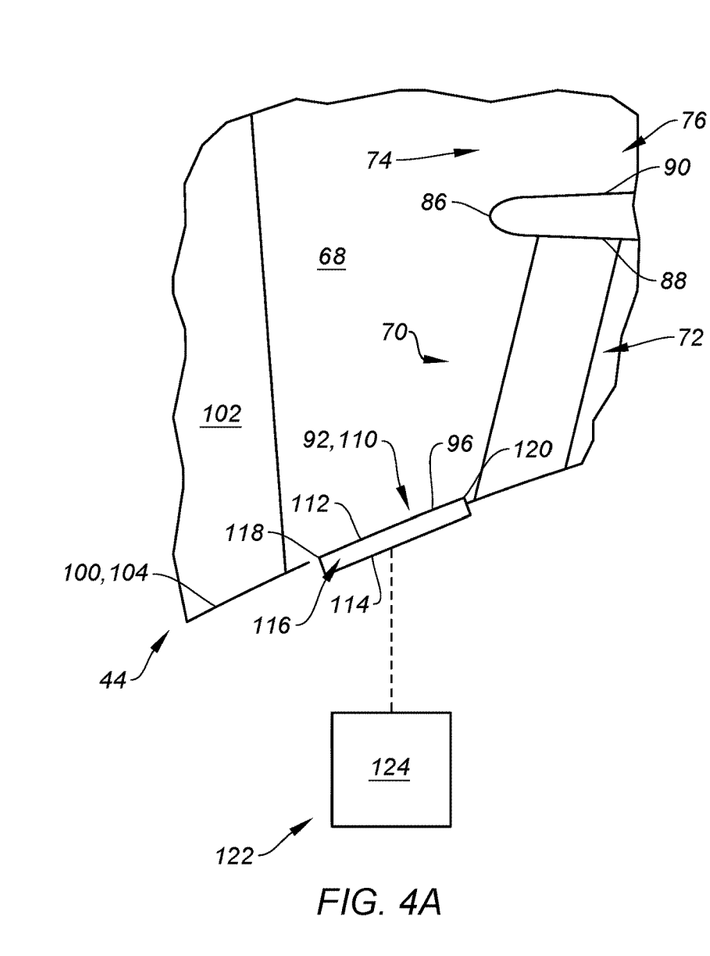
FIGS. 4A and 4B are schematic illustrations of a portion of the powerplant with another inner inflatable bladder in various arrangements.
Figure 4B:
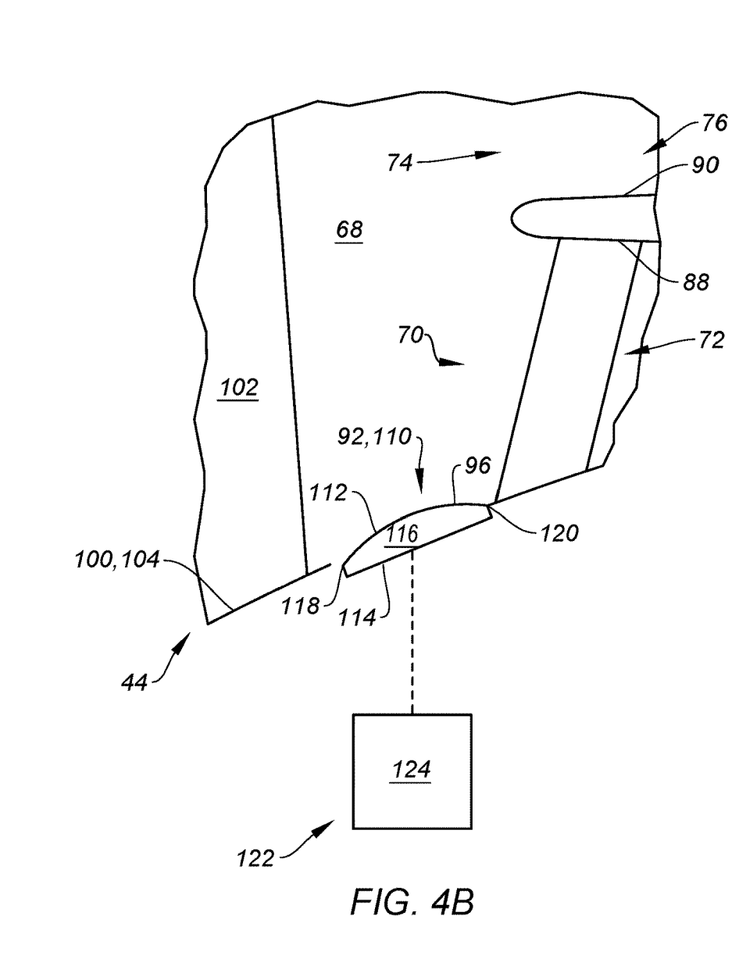

The air system 122 is also configured to direct air out of the inner interior volume 116 to deflate the inner inflatable bladder 110; e.g., from the arrangement of FIG. 3B to FIG. 3A. This deflation of the inner inflatable bladder 110 deforms the inner deformable face skin 112 and thereby changes the sectional geometry of the radial outer surface 96. More particularly, the deflation of the inner inflatable bladder 110 allows the axial center of the inner deformable face skin 112 to move (e.g., retract) radially inwards towards the axis 24 (see FIG. 2). The inner deformable face skin 112 and the radial outer surface 96 may thereby have a straight-line geometry when viewed, for example, in the reference plane. Here, the sectional geometry of the inner deformable face skin 112 and the radial outer surface 96 matches a sectional geometry of the inner rigid backing 114. It is contemplated, therefore, the inner rigid backing 114 may alternatively be configured with another sectional geometry such that the inner deformable face skin 112 and the radial outer surface 96 may have a (e.g., slightly) convex geometry or a (e.g., slightly) concave geometry when the inner inflatable bladder 110 is deflated. Moreover, while the inner deformable face skin 112 is described above as engaging (e.g., contacting) and laying against the inner rigid backing 114 when the inner inflatable bladder 110 is deflated, the present disclosure is not limited to such an exemplary configuration. For example, referring to FIGS. 4A and 4B, the inner rigid backing 114 may alternatively be radially spaced (e.g., recessed inward) from the inner deformable face skin 112 when the inner inflatable bladder 110 is inflated and deflated.

Figure 5A:
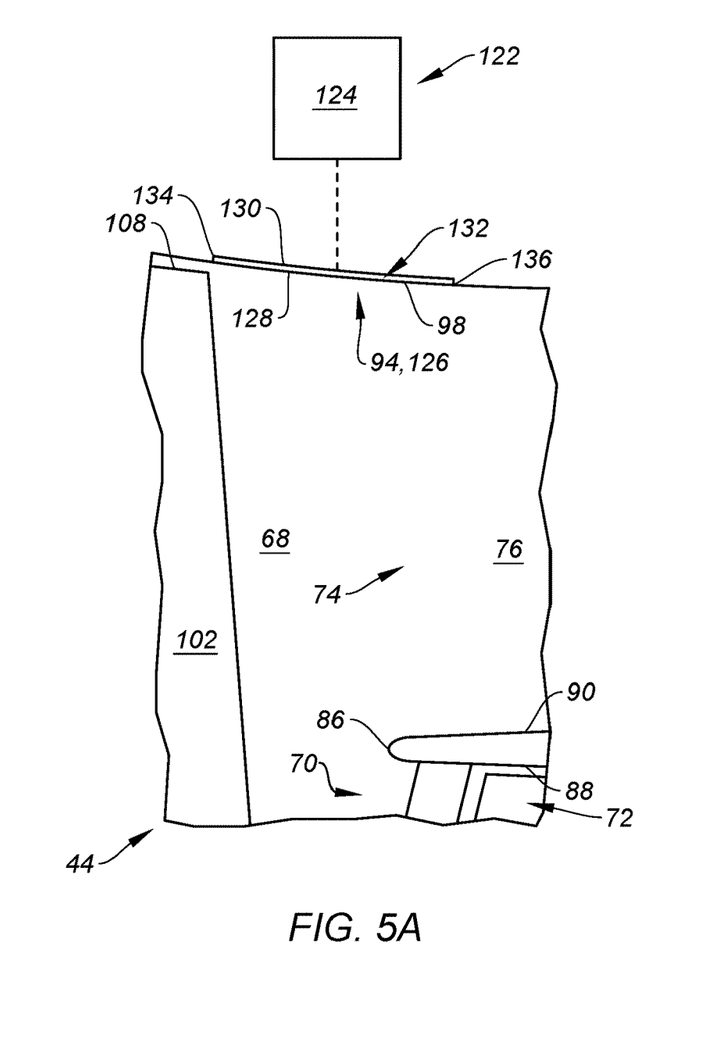
FIGS. 5A and 5B are schematic illustrations of a portion of the powerplant with the outer inflatable bladder in various arrangements.
Figure 5B:
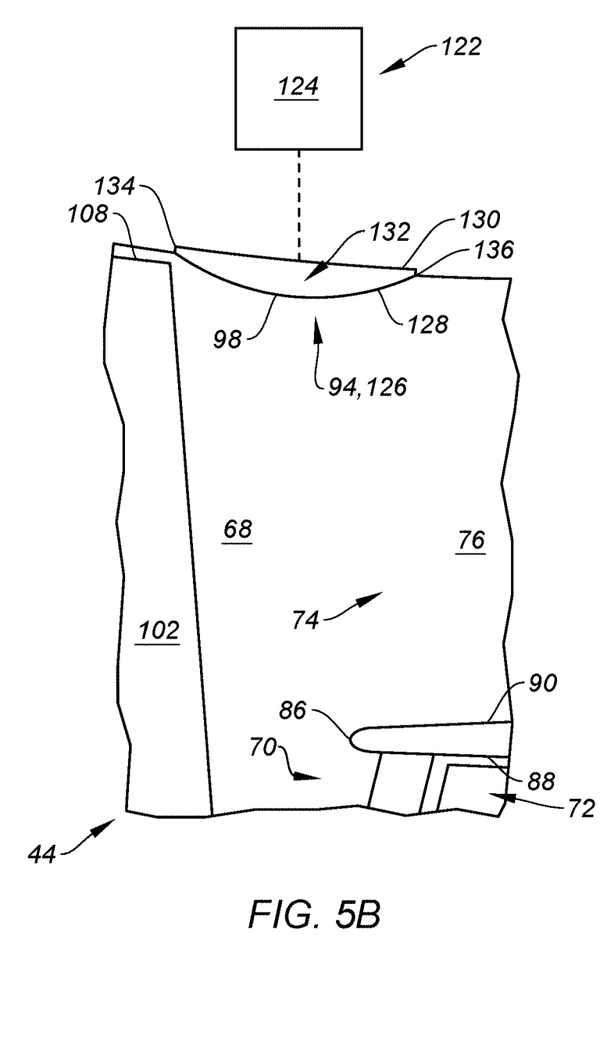

Referring to FIG. 2, the outer flowpath wall 94 may extend longitudinally along the propulsor flowpath 68 and longitudinally along at least a forward, upstream section of the bypass flowpath 76. Referring to FIGS. 5A and 5B, the outer flowpath wall 94 is configured with an outer inflatable bladder 126 which at least partially or completely forms the radial inner surface 98; here, a radial inner surface next to and downstream of the propulsor rotor 44. The outer inflatable bladder 126 of FIGS. 5A and 5B, for example, includes an outer deformable face skin 128, an outer rigid backing 130 (e.g., a back skin, a support structure, etc.) and an outer interior volume 132.

The outer deformable face skin 128 extends from (or about) a trailing edge face plane of the propulsor rotor 44 at (or about) its blade ends 108 to, for example, a location (e.g., slightly) downstream of the bypass inlet 74. The outer deformable face skin 128 and, more generally, the outer inflatable bladder 126 may thereby be disposed at the bypass inlet 74. A majority (e.g., more than fifty percent, seventy percent or even ninety percent) of the outer inflatable bladder 126 and its outer deformable face skin 128 of FIGS. 5A and 5B, for example, is located forward, upstream of the bypass inlet 74. Of course, in other embodiments, it is contemplated an entirety of the outer inflatable bladder 126 and its outer deformable face skin 128 may be located forward, upstream of the bypass inlet 74. The outer deformable face skin 128 extends circumferentially about (e.g., completely around) the axis 24 providing the outer deformable face skin 128 with a full-hoop (e.g., tubular, frustoconical) geometry. The outer deformable face skin 128 of FIGS. 5A and 5B may thereby form at least a longitudinal section (e.g., axial section) of or an entirety of the radial outer surface 96 of the outer flowpath wall 94.

The outer deformable face skin 128 is constructed from a deformable and resilient material (e.g., a non-metal composite material), which may be the same as or different than the material forming the inner deformable face skin 112 (e.g., see FIGS. 3A and 3B). The outer deformable face skin 128, for example, may include a polymer matrix and fiber reinforcement embedded within the polymer matrix. The polymer matrix may be an elastomer such as rubber. The fiber reinforcement may include one or more woven or non-woven layers of long-strand, short-strand or chopped fibers; e.g., fiberglass fibers, carbon fibers, aramid fibers (e.g., Kevlar® fibers), or any combination thereof. It is contemplated, however, the outer deformable face skin 128 may alternatively be constructed from the polymer matrix with the fiber reinforcement to a side of the polymer matrix or even without the fiber reinforcement in select embodiments. The present disclosure, however, is not limited to such exemplary outer deformable face skin constructions or materials.

This outer rigid backing 130 extends axially along the outer deformable face skin 128. The outer rigid backing 130 extends circumferentially about (e.g., completely around) the axis 24 providing the outer rigid backing 130 with a full-hoop (e.g., tubular, frustoconical, cylindrical) geometry. This outer rigid backing 130 may be cast, machined, additive manufactured and/or otherwise formed as a metal hoop structure. Alternatively, the outer rigid backing 130 may be formed from shaped sheet metal. The present disclosure, however, is not limited to such exemplary outer rigid backing constructions or materials. For example, the outer rigid backing 130 may alternatively be formed from a rigid non-metal composite material.

The outer rigid backing 130 may be configured as, or may otherwise include, a backing wall for the outer inflatable bladder 126. The outer deformable face skin 128 of FIGS. 5A and 5B, for example, is connected to the outer rigid backing 130 at or about opposing axial ends 134 and 136 of the outer inflatable bladder 126 and its members 128 and 130. At these connections, the outer deformable face skin 128 is also sealed (e.g., directly or indirectly) against the outer rigid backing 130. The outer interior volume 132 is thereby formed by the outer deformable face skin 128 and the outer rigid backing 130. The outer interior volume 132 of FIGS. 5A and 5B, for example, extends radially within the outer inflatable bladder 126 between and to the outer deformable face skin 128 and the outer rigid backing 130. The outer interior volume 132 of FIGS. 5A and 5B extends axially within the outer inflatable bladder 126 between and to the connections between the outer deformable face skin 128 and the outer rigid backing 130.

When the outer inflatable bladder 126 is deflated as shown in FIG. 5A, the outer interior volume 132 may substantially or completely collapse and the outer deformable face skin 128 may engage and lay against the outer rigid backing 130. However, when the outer inflatable bladder 126 is inflated as shown in FIG. 5B, the outer interior volume 132 grows in size and the outer deformable face skin 128 moves radially away from and is spaced from (e.g., at an axial center of the outer inflatable bladder 126) the outer rigid backing 130.

The inflating and deflating of the outer inflatable bladder 126 is controlled by the air system 122 of the turbine engine 22 (or alternatively another air system). This air system 122 is configured to direct air into the outer interior volume 132 to inflate the outer inflatable bladder 126; e.g., from the arrangement of FIG. 5A to FIG. 5B. This inflation of the outer inflatable bladder 126 deforms the outer deformable face skin 128 and thereby changes a sectional geometry of the radial inner surface 98. More particularly, the inflation of the outer inflatable bladder 126 pushes (e.g., bulges) an axial center of the outer deformable face skin 128 radially inwards towards the axis 24 (see FIG. 2). The outer deformable face skin 128 and the radial inner surface 98 may thereby have a convex geometry when viewed, for example, in the reference plane.

Figure 6A:
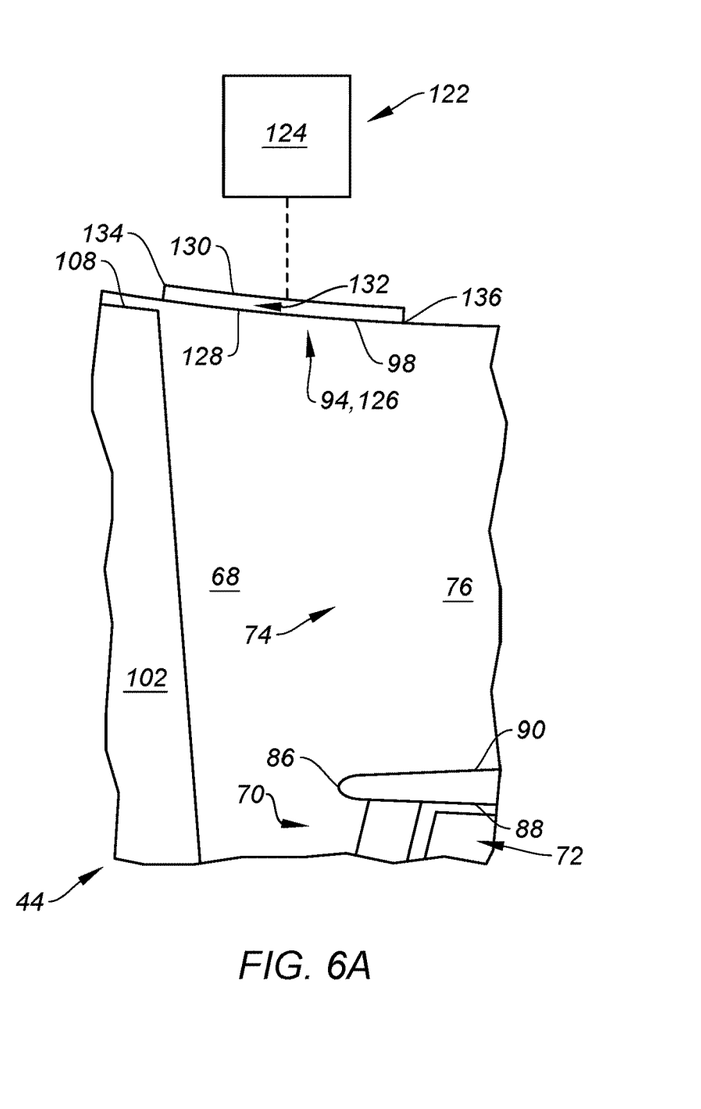
FIGS. 6A and 6B are schematic illustrations of a portion of the powerplant with another outer inflatable bladder in various arrangements.
Figure 6B:
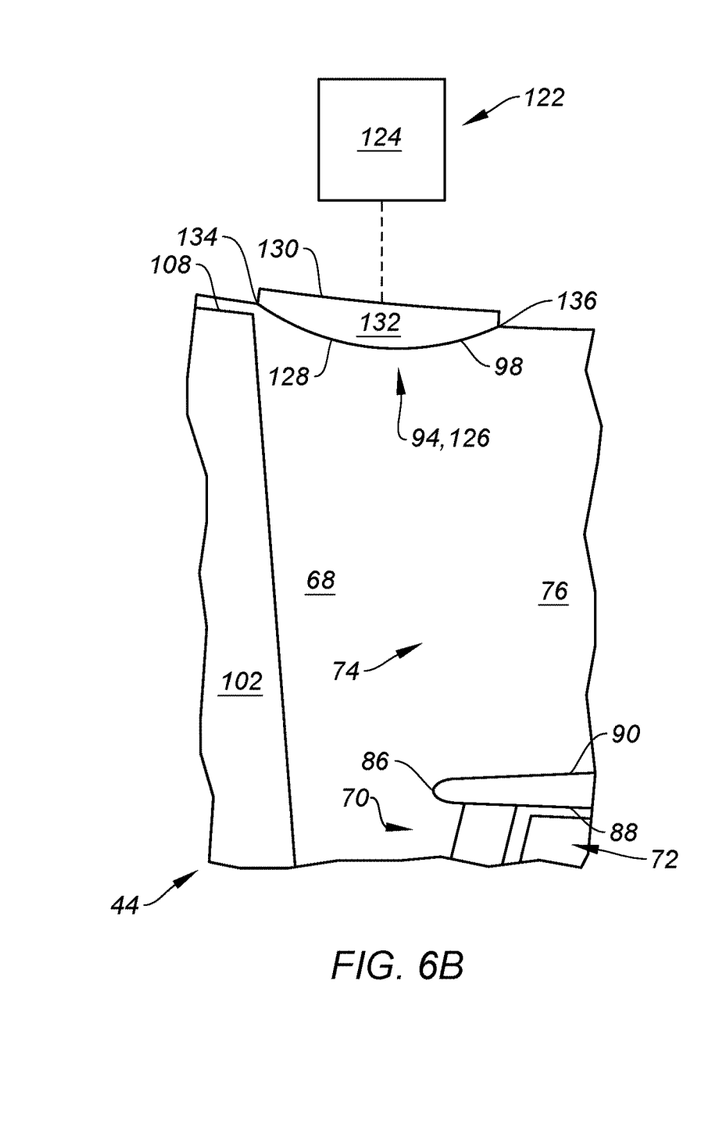

The air system 122 is also configured to direct air out of the outer interior volume 132 to deflate the outer inflatable bladder 126; e.g., from the arrangement of FIG. 5B to FIG. 5A. This deflation of the outer inflatable bladder 126 deforms the outer deformable face skin 128 and thereby changes the sectional geometry of the radial inner surface 98. More particularly, the deflation of the outer inflatable bladder 126 allows the axial center of the outer deformable face skin 128 to move (e.g., retract) radially outwards away from the axis 24 (see FIG. 2). The outer deformable face skin 128 and the radial inner surface 98 may thereby have a straight-line geometry when viewed, for example, in the reference plane. Here, the sectional geometry of the outer deformable face skin 128 and the radial inner surface 98 matches a sectional geometry of the outer rigid backing 130. It is contemplated, therefore, the outer rigid backing 130 may alternatively be configured with another sectional geometry such that the outer deformable face skin 128 and the radial inner surface 98 may have a (e.g., slightly) convex geometry or a (e.g., slightly) concave geometry when the outer inflatable bladder 126 is deflated. Moreover, while the outer deformable face skin 128 is described above as engaging (e.g., contacting) and laying against the outer rigid backing 130 when the outer inflatable bladder 126 is deflated, the present disclosure is not limited to such an exemplary configuration. For example, referring to FIGS. 6A and 6B, the outer rigid backing 130 may alternatively be radially spaced (e.g., recessed inward) from the outer deformable face skin 128 when the outer inflatable bladder 126 is inflated and deflated.

Referring to FIG. 2, to adjust the ratio of the airflow flowing out of the propulsor flowpath 68 into the core flowpath 72 and the bypass flowpath 76, the air system 122 may be operated to selectively inflate or deflate the inner inflatable bladder 110 and/or selectively inflate or deflate the outer inflatable bladder 126. For example, to accommodate increased airflow into the bypass flowpath 76, the air system 122 may partially or completely inflate the inner inflatable bladder 110 where the outer inflatable bladder 126 is completely or partially deflated. In another example, to accommodate increased airflow into the core flowpath 72, the air system 122 may partially or completely inflate the outer inflatable bladder 126 where the inner inflatable bladder 110 is completely or partially deflated. Of course, it is contemplated both the inner inflatable bladder 110 and the outer inflatable bladder 126 may be concurrently (partially or fully) inflated or deflated for select mode(s) of engine operation.

Figure 7:
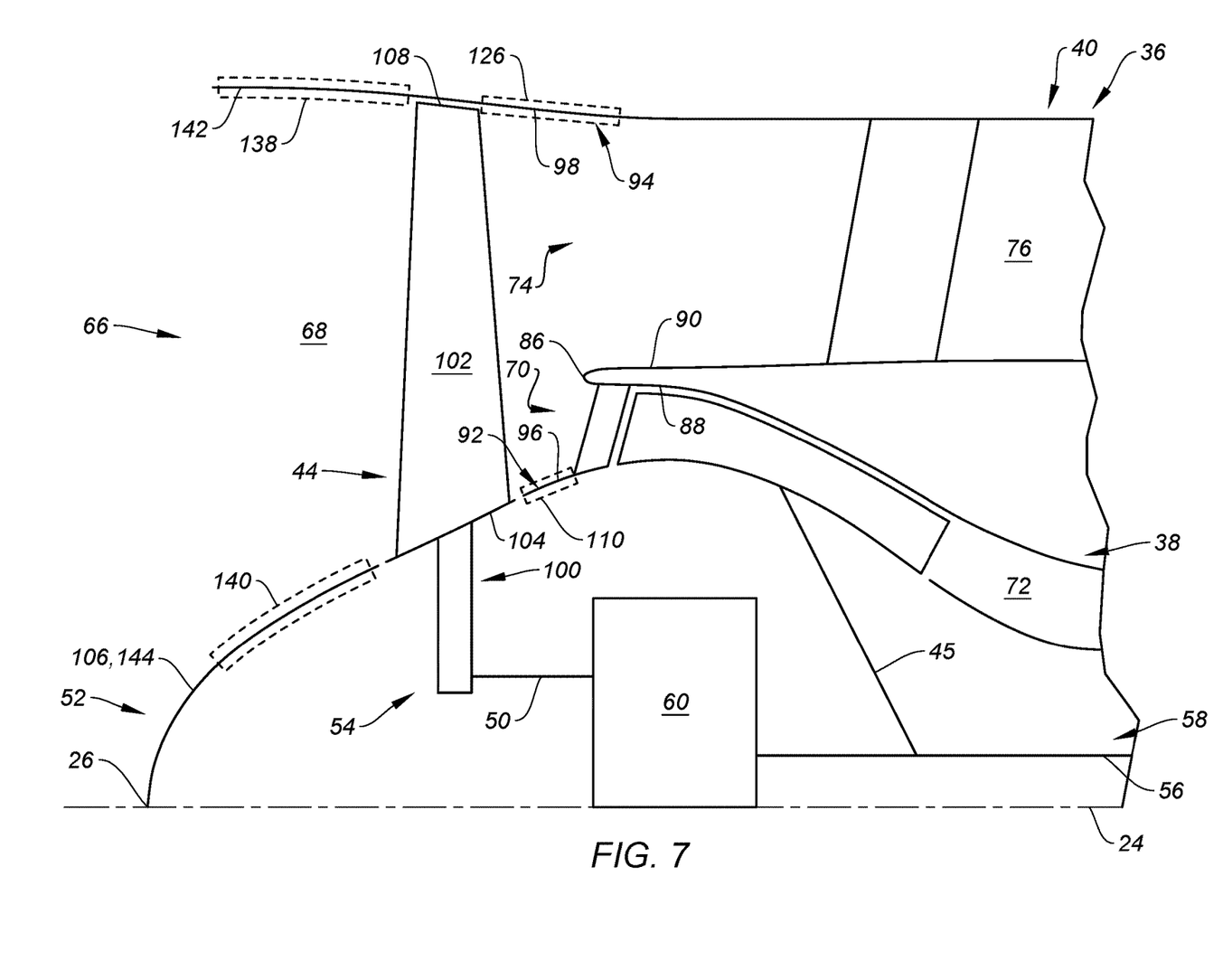
FIG. 7 is a schematic illustration of a portion of the powerplant at a splitter between flowpaths with additional inflatable bladders.

While the turbine engine 22 is described above with the two inflatable bladders, the present disclosure is not limited to such an exemplary arrangement. The turbine engine 22, for example, may alternatively be configured with a single inflatable bladder; e.g., the inner inflatable bladder 110 or the outer inflatable bladder 126 may be omitted. In another example, referring to FIG. 7, the turbine engine 22 may also (or alternatively) include one or more inflatable bladders 138 and 140 (schematically shown) disposed forward, upstream of the propulsor rotor 44. The outer flowpath wall 94 of FIG. 7, for example, includes the upstream outer inflatable bladder 138. This upstream outer inflatable bladder 138 is configured to form a deformable radial inner surface 142 upstream of the propulsor rotor 44. Similarly, where the nose cone 52 is decoupled from the propulsor rotor 44 and configured as a stationary engine component, the radial outer wall 106 of the nose cone 52 (e.g., another inner flowpath wall) includes the upstream inner inflatable bladder 140. This upstream inner inflatable bladder 140 is configured to form a deformable radial outer surface 144 upstream of the propulsor rotor 44. Each of these inflatable bladders 138, 140 may have a similar (or the same) configuration as described above with respect to the inner inflatable bladder 110 and/or the outer inflatable bladder 126. The air system 122 may thereby similarly partially inflate or deflate any one or more or all of the inflatable bladders 110, 126, 138, 140 to adjust the ratio of the airflow flowing out of the propulsor flowpath 68 into the core flowpath 72 and the bypass flowpath 76 and/or generally shift (e.g., push radially inward or outward) airflow within the propulsor flowpath 68.

Figure 8:
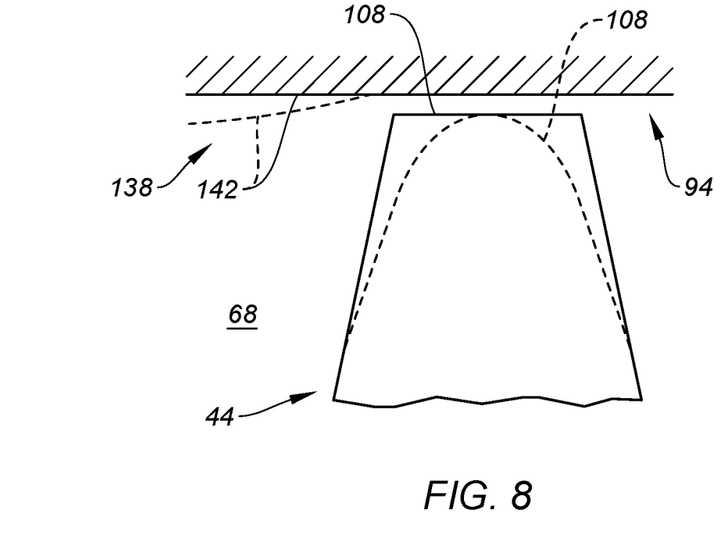
FIG. 8 is a schematic illustration of a portion of the powerplant at a blade tip with an upstream outer inflatable bladder.

In some embodiments, referring to FIGS. 8, the upstream outer inflatable bladder 138 may be inflated to accommodate rotor blade wear at the blade ends 108. For example, the upstream outer inflatable bladder 138 may be inflated to effectively move the outer flowpath wall 94 inward.

Figure 9A:
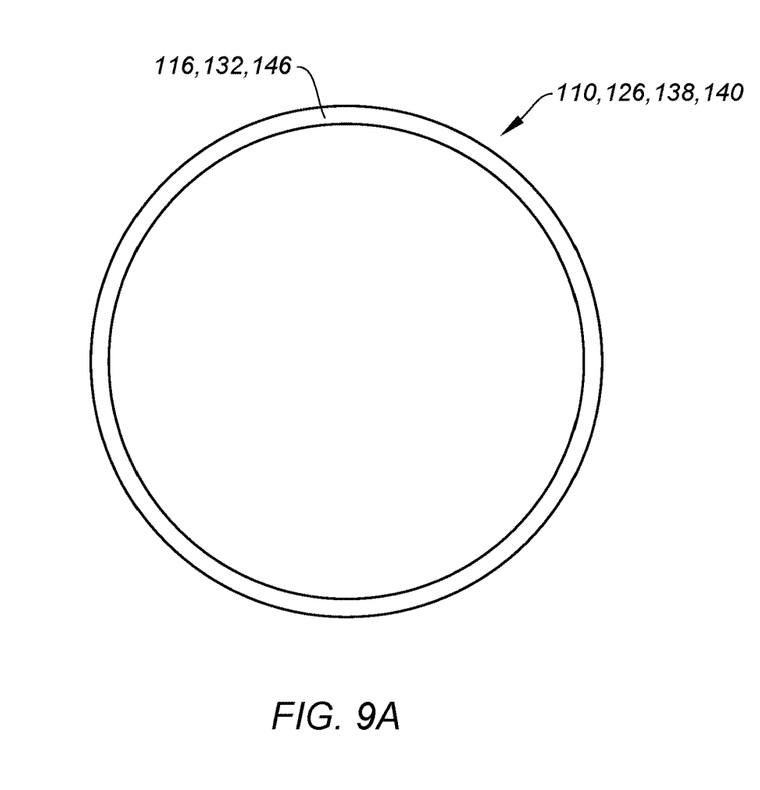
FIGS. 9A and 9B are schematic illustrations of various inflatable bladder configurations.
Figure 9B:
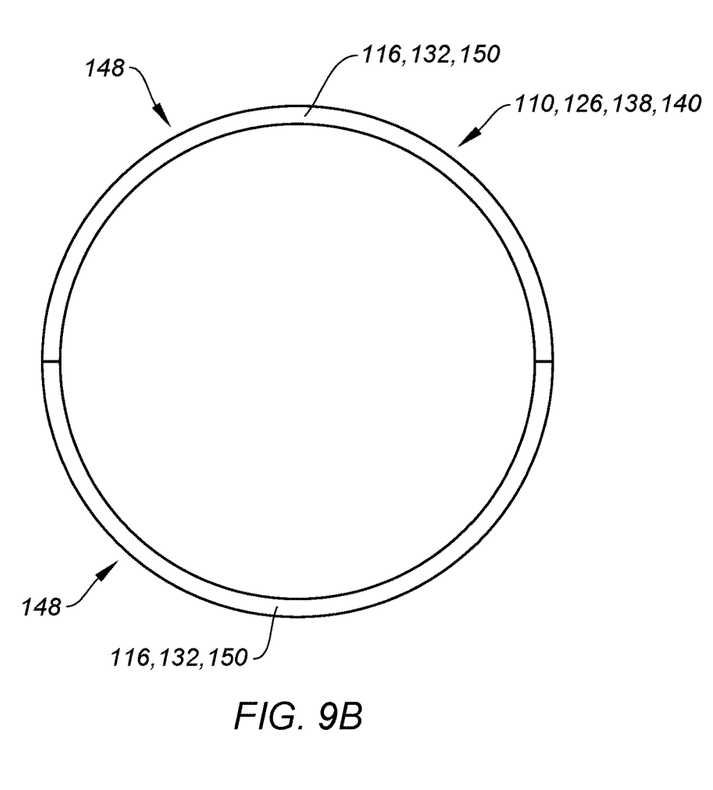

In some embodiments, referring to FIG. 9A, each inflatable bladder 110, 126, 138, 140 may be configured with an annular interior volume 146 (e.g., 116, 132). In other embodiments, referring to FIG. 9B, any one or more or all of the inflatable bladders 110, 126, 138, 140 may each be configured into one or more circumferential sections 148; e.g., arcuate sections. Each circumferential section 148 may be associated with a fluidly discrete interior volume 150 (e.g., 116, 132). With such an arrangement, the inflation/the deflation of the respective inflatable bladder 110, 126, 138, 140 may be individually adjusted relative to circumferential position.

The inflatable bladder(s) 110, 126, 138, 140 and the air system 122 may be included in various turbine engines other than the one described above. The inflatable bladder(s) 110, 126, 138, 140 and the air system 122, for example, may be included in a turbine engine configured with a single spool, with two spools (e.g., see FIG. 1), or with more than two spools. The turbine engine may be configured as a turbofan engine, a turbojet engine with multiple flowpaths or any other type of turbine engine or other aircraft powerplant which would benefit from an adjustable split line.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft propulsion system, comprising:
    a propulsor rotor rotatable about an axis, the propulsor rotor including a plurality of propulsor blades and an inner platform, and the plurality of propulsor blades arranged circumferentially about the axis and projecting radially out from the inner platform; and
    a flowpath wall next to and downstream of the inner platform, the flowpath wall comprising an inflatable bladder and a radial outer surface, and the inflatable bladder configured to change a geometry of the radial outer surface.

2. The assembly of claim 1, further comprising an air system fluidly coupled to an interior volume of the inflatable bladder.

3. The assembly of claim 2, wherein the air system is configured to at least one of
    direct air into the interior volume of the inflatable bladder to deform the radial outer surface in a radial outward direction; or
    direct air out of the interior of the inflatable bladder to deform the radial outer surface in a radial inward direction.

4. The assembly of claim 1, wherein, when viewed in a reference plane parallel with the axis, at least one of
    the radial outer surface has a convex geometry with the inflatable bladder inflated; or
    the radial outer surface has a straight line geometry with the inflatable bladder deflated.

5. The assembly of claim 1, wherein the inflatable bladder includes a deformable face skin, a rigid backing and an interior volume radially between the deformable face skin and the rigid backing.

6. The assembly of claim 5, wherein the deformable face skin is configured to rest radially against the rigid backing with the inflatable bladder deflated.

7. The assembly of claim 5, wherein the deformable face skin is spaced radially from the rigid backing with the inflatable bladder deflated.

8. The assembly of claim 5, wherein
the deformable face skin includes a polymer matrix and fiber reinforcement embedded within the polymer matrix; and
the rigid backing comprises metal.

9. The assembly of claim 1, wherein the inflatable bladder is annular.

10. The assembly of claim 1, wherein the propulsor rotor comprises a fan rotor.

11. The assembly of claim 1, further comprising:
an engine core configured to drive rotation of the propulsor rotor about the axis, the engine core including a core flowpath, a compressor section, a combustor section and a turbine section;
the core flowpath extending from a core inlet into the core flowpath, through the compressor section, the combustor section and the turbine section, to a core exhaust from the core flowpath; and
the inflatable bladder disposed at the core inlet.

12. The assembly of claim 11, wherein the inflatable bladder is arranged upstream of the core inlet.

13. The assembly of claim 11, further comprising:
a bypass flowpath disposed outside of the engine core, the bypass flowpath extending from a bypass inlet into the bypass flowpath to a bypass exhaust from the bypass flowpath; and
a splitter downstream of the propulsor rotor, the splitter forming an outer peripheral boundary of the core inlet, and the splitter forming an inner peripheral boundary of the bypass inlet.

14. The assembly of claim 13, wherein the flowpath wall is an inner flowpath wall and the inflatable bladder is an inner inflatable bladder, and further comprising:
an outer flowpath wall comprising an outer inflatable bladder and a radial inner surface;
the outer inflatable bladder disposed at the bypass inlet; and
the outer inflatable bladder configured to change a geometry of the radial inner surface.

15. The assembly of claim 1, wherein the flowpath wall is an inner flowpath wall and the inflatable bladder is an inner inflatable bladder, and further comprising:
an outer flowpath wall next to an outer periphery of the propulsor rotor;
the outer flowpath wall comprising an outer inflatable bladder and a radial inner surface that is upstream of the propulsor rotor; and
the outer inflatable bladder configured to change a geometry of the radial inner surface.

16. The assembly of claim 1, wherein the flowpath wall is a downstream flowpath wall, the inflatable bladder is a downstream inflatable bladder and the radial outer surface is a downstream radial outer surface, and further comprising:
an upstream flowpath wall next to and upstream of the inner platform;
the upstream flowpath wall comprising an upstream inflatable bladder and an upstream radial outer surface; and
the upstream inflatable bladder configured to change a geometry of the upstream radial outer surface.

17. The assembly of claim 16, further comprising a stationary nose cone that comprises the upstream flowpath wall.

18. An assembly for an aircraft propulsion system, comprising:
a bladed rotor rotatable about an axis;
an inner flowpath wall downstream of the bladed rotor, the inner flowpath wall comprising an inner inflatable bladder and a radial outer surface, the inner inflatable bladder configured to change a geometry of the radial outer surface, and the radial outer surface forming a radial inner peripheral boundary of a flowpath; and
an outer flowpath wall axially overlapping and circumscribing the inner flowpath wall, the outer flowpath wall comprising an outer inflatable bladder and a radial inner surface, the outer inflatable bladder configured to change a geometry of the radial inner surface, and the radial inner surface forming a radial outer peripheral boundary of the flowpath.

19. An assembly for an aircraft propulsion system, comprising:
a propulsor rotor rotatable about an axis; and
a flowpath wall next to an outer periphery of the propulsor rotor, the flowpath wall comprising an inflatable bladder and a radial inner surface that is downstream of the propulsor rotor, and the inflatable bladder configured to change a geometry of the radial inner surface;
wherein, when viewed in a reference plane parallel with the axis, the radial inner surface has a convex geometry or a straight line geometry with the inflatable bladder deflated;
further comprising:
a splitter downstream of the propulsor rotor, the splitter forming an outer peripheral boundary of an inlet into a core flowpath, and the splitter forming an inner peripheral boundary of an inlet into a bypass flowpath;
at least an axial majority of the inflatable bladder is arranged upstream of the splitter.

* * * * *